United States Patent Office 3,008,867
Patented Nov. 14, 1961

3,008,867
INORGANIC PAPERS AND METHODS OF MAKING SAME
Robert J. Holmes, Huntington, N.Y., assignor to General Aniline & Film Corporation, New York, N.Y., a corporation of Delaware
No Drawing. Filed Feb. 18, 1957, Ser. No. 640,585
15 Claims. (Cl. 162—152)

This invention relates to new, useful and improved processes for the preparation of paper and paper-like products, particularly in sheet form, from mineral substances and the products resulting therefrom.

Papers and the like prepared from mineral or inorganic substances have been developed as specialty papers for use in numerous fields of application where the common cellulosic base type paper was found to be sadly deficient in many desired properties. In its electronics applications, paper finds extensive use in capacitors as a dielectric material. However, the dielectric properties of paper are greatly inferior to those of mica and the various ceramics used for such purposes. In addition, at elevated temperatures the cellulosic papers are practically worthless due to the degeneration of the organic cellulosic matter. On the other hand, dielectric materials prepared from the inorganic base substances such as glass, ceramics, mica and the like do not suffer from such deficiencies as described above for the cellulosic papers. However, in contradistinction to the advantages of such inorganic materials for the above enumerated properties, these inorganic dielectric substances have certain inherent properties which normally render them undesirable in many instances. Thus the inorganic dielectrics have not found extensive or, indeed, practical application in the electronics field and other allied fields where flexibility and strength are necessary and/or desirable characteristics of the dielectric product, and this is especially so where the product must be of "paper" thinness, that is, normally less than about 0.01 inch in thickness. Heretofore attempts to prepare such products employing organic binders and in particular resins such as are used in conventional paper making processes did not produce a satisfactory product. First, it was found that in view of the difficulty in coating wet inorganic fibers, excessive amounts of such resins are required. This difficulty in coating the mineral fibers manifested itself in the formation of resin clots rather than in a desired and necessary uniform distribution of the resin. Secondly, finished sheets prepared from such earlier procedures did not have the qualities of the fibers and did not therefore resemble a "paper" product but rather resulted in a plastic product reinforced with an inorganic filler, and this because of the high ratio of resin to fibers required. Other attempts to overcome these difficulties wherein on the one hand the fibers are precoated and on the other hand organic solvents are employed in lieu of water as the liquid dispersing medium for the fibers did not prove successful. The products resulting from these manipulations resembled loosely carded webs and were not possessed of the characteristics of a paper sheet. Still another problem arising from the attempts to use the conventional resins developed for use with cellulose pulps is that many of such resins were developed for use at pH values of from about 6 to 8 and these resins were found to be completely inoperative at the pH values (pH about 3 to 4) normally employed in the making of inorganic papers.

It is an object of this invention to provide a process for the preparation of paper and/or paper-like products from inorganic materials.

It is a further object of this invention to provide a process whereby sheet-like materials may be prepared from mineral fibers and the like.

It is a still further object of this invention to provide strong and flexible sheet-like materials derived from inorganic base substances.

It is another object of this invention to provide processes for the manufacture of inorganic papers employing a polyvinyl lactam-containing polymeric material.

It is another object of this invention to provide inorganic papers containing a polyvinyl lactam-containing polymeric material.

Other objects will appear hereinafter as the description proceeds.

It was unexpectedly discovered that in the preparation of paper and other sheet-like materials having as a major basis therefor inorganic fibers or flakes, the incorporation during the paper-making process of minor amounts of a polyvinyl lactam-containing polymeric material in the paper-making composition produced a product having all of the advantages ascribable to the inorganic constituents of the paper but still nevertheless possessed of the important characteristics of strength and flexibility not heretofore obtainable in such types of paper.

The general procedure for manufacturing the papers of this invention involves techniques similar to those heretofore employed in the paper-making art with the outstanding differences being the addition to the inorganic paper-making stock at some period in the paper-making process, between beating and deposition on the wire, of a polyvinyl lactam-containing polymeric material while maintaining the stock at a temperature of from about 120° F. to about 150° F. More particularly, the general process involves dispersing the inorganic material in a relatively large volume of water at a pH of from about 3 to 5 and agitating the mixture vigorously. The temperature is then raised to 120° to 150° F. and to the suspension is then added the polyvinyl lactam-containing polymeric material, and after additional mixing, it is preferable that a means for insolubilizing the polyvinyl lactam-containing polymeric material on to the mineral base be employed. The stock is again additionally agitated mildly and the resultant slurry maintained at above about 100° F. is then processed in the normal manner to form a paper-like sheet.

The polyvinyl lactam-containing polymeric materials which may be used in the present invention include all of the polyvinyl lactam-containing water-soluble polymers, copolymers and mixtures containing a minimum of 20% N-vinyl lactam.

Polymeric N-vinyl lactams, as exemplified by polyvinylpyrrolidone (PVP, poly-1-vinyl-2-pyrrolidone, poly-N-vinyl-2-pyrrolidone, poly-N-vinyl-α-pyrrolidone), are by this time well known as extremely versatile chemicals which have found many uses in a variety of fields. They are white powders or colorless, horn-like or glass-like materials with a high softening point and have the highly desirable property of being soluble in water. They are characterized by the following general structural formula:

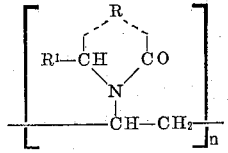

wherein R represents an alkylene bridge group necessary to complete 5-, 6- or 7-membered heterocyclic ring systems, R¹ represents hydrogen or a lower alkyl group such as methyl or ethyl, and n represents a number indicative of the extent of polymerization and is usually at least 3 or 4. They are obtained by polymerizing organic 5-, 6-, or 7-membered ring compounds containing in their rings the —NH—CO— group such as, for example, N-vinyl-2-pyrrolidone, N-vinyl-5, -4, and -3-methyl-2-pyrrolidones, N-vinyl-2,2-dimethyl-2-pyrrolidone, N-vinyl-2-pyrrolidone, N-vinyl-e-caprolactam, N-vinyl-hexa-hydrophthalamidine and the like. Depending upon the extent of polymerization, they may have molecular weights ranging from at least about 300 up to 2,000,000 or more, and preferably from about 400 to about 70,000. Viscosity measurements are commonly used as an indication of the average molecular weight of polymeric compositions, the instant polymers being characterized by a chain of carbon atoms to which the lactam rings are attached through their nitrogen atoms, as follows:

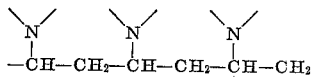

The K value (Finkentscher) of any particular mixture of polymers is calculated from viscosity data and is useful as an indication of the average molecular weight of such mixture. Its determination is fully described in "Modern Plastics," 23, No. 3, 157–61, 212, 214, 216, 218 (1945) and is defined as 1000 times $k$ in the empirical relative viscosity equation:

$$\frac{\log_{10} \eta_{rel}}{C} = \frac{75k^2}{1+1.5kC} + k$$

wherein C is the concentration in grams per hundred cc. of polymer solution and $\eta_{rel}$ is the ratio of the viscosity of the solution to that of pure solvent. The K values are reported as 1000 times the calculated viscosity coefficient in order to avoid the use of decimals. For the purpose of the present invention, there may be employed those polymeric N-vinyl lactams having a K value of about 10 to 200, and preferably of about 20 to 100.

K values and specific viscosities ($\eta_{sp}$) are interconvertible and are related through relative viscosity ($\eta_{rel}$). Thus, when viscosity measurements are taken on solutions which have a concentration of 1.00 gram of polymer per deciliter of solution at 25° C. ($c.=1$), the relationships are as follows:

$\eta_{rel} = \eta_{sp}$ plus one

Relative viscosity = specific viscosity plus one

Relative viscosity = $10^{[0.001K+0.000075K^2/(1+0.0015K)]}$

Hence, $\eta_{sp} = -1 + 10^{[0.001K+0.000075K^2/(1+0.0015K)]}$

Relative viscosity, specific viscosity, and K are dimensionless, whereas inherent viscosity $$\frac{(\log_e \eta_{rel})}{C}$$

and intrinsic viscosity (the limit of inherent viscosity as C approaches zero) have the dimensions of dilution, i.e., the reciprocal of concentration. Intrinsic viscosity and K are intended to be independent of concentration.

The number of recurring polymer units enclosed by brackets in the foregoing general structural formula, indicated by "$n$," or the extent or degree of polymerization, corresponds to a chain of roughly 4 to 20,000 monomer units or more. In actual practice, a mixture of polymeric molecules, each containing a different number ($n$) of monomer units, is always produced. These homo-polymers are readily prepared by the procedural steps given in U.S. Patents 2,265,450, 2,317,804 and 2,335,454 in which working examples of species included within the above formula are given and which are incorporated herein by reference thereto.

Water-soluble copolymers operative in the instant invention are derived from polymerizable monomeric compositions containing at least about 20% by weight of an N-vinyl lactam. The proportion of N-vinyl lactam present in such polymerizable monomeric compositions will depend upon the amount and nature of the other monomer or monomers, but should in all cases be at least sufficient to impart to the final copolymer the desired water-soluble property. By way of example, the following list gives the maximum limit of representative monomers which may be copolymerized with the N-vinyl lactam for the production of operable copolymers:

| | Percent |
|---|---|
| Allyl alcohol | 50 |
| Diallyl phthalate | 20 |
| Isobutyl vinyl ether | 20 |
| Ethyl vinyl ether | 50 |
| Methyl vinyl ether | 80 |
| Maleic anhydride | 80 |
| Vinyl acetate | 40 |
| Vinyl chloride | 35 |
| Acrylic acid | 75 |
| Vinyl laurate | 20 |
| Vinyl stearate | 15 |

The following table lists some monomeric compositions useful in the production of suitable water-soluble copolymers.

TABLE

| | | Percent |
|---|---|---|
| (1) | { N-vinyl-2-pyrrolidone | 70 |
|  | { Allyl alcohol | 30 |
| (2) | { N-vinyl-2-pyrrolidone | 85 |
|  | { Diallyl phthalate | 15 |
| (3) | { N-vinyl-2-pyrrolidone | 60 |
|  | { Vinyl ethyl ether | 40 |
| (4) | { N-vinyl-2-pyrrolidone | 30 |
|  | { Vinyl methyl ether | 70 |
| (5) | { N-vinyl-2-pyrrolidone | 75 |
|  | { Vinyl acetate | 25 |
| (6) | { N-vinyl-2-pyrrolidone | 50 |
|  | { Acrylic acid | 50 |
| (7) | { N-vinyl-2-pyrrolidone | 20 |
|  | { Maleic anhydride | 80 |
| (8) | { N-vinyl-2-pyrrolidone | 94 |
|  | { Vinyl stearate | 6 |
| (9) | { 3-methyl-N-vinyl-2-pyrrolidone | 87 |
|  | { Vinyl bromide | 13 |
| (10) | { 3-methyl-N-vinyl-2-pyrrolidone | 87 |
|  | { Vinyl chloride | 13 |
| (11) | { 4-methyl-N-vinyl-2-pyrrolidone | 88 |
|  | { Vinyl chloride | 12 |
| (12) | { 3,3-dimethyl-N-vinyl-2-pyrrolidone | 91 |
|  | { Vinyl chloride | 9 |

It will be understood that the above-described copolymers are generally prepared in the same manner as the homo-polymers of the N-vinyl lactams and have similar properties with respect to water-solubility, K values and the like.

Instead of copolymers prepared from mixtures of monomers as described above, a water-soluble polymeric material may be employed which is produced by mixing the polymerized N-vinyl lactam with one or more of the polymerized monomeric unsaturated compounds employed in producing such copolymers provided of course that the mixture contains at least 20% of polymerized N-vinyl lactam, is water soluble, and has the above-described properties with respect to K values and the like.

The preferred N-vinyl lactams for use in the compositions of the instant invention are N-vinyl-2-pyrrolidone and its lower alkyl substituted derivatives, which may be characterized by the formula:

in which one or more of the hydrogen atoms in the cyclic methylene groups may be substituted by a lower alkyl radical such as methyl, ethyl or the like.

Among the means which may be employed to effect the insolubilization of the polyvinyl lactam-containing polymeric substances on the inorganic fiber or flake are the following:

I. Chemical means:
  (a) Polybasic acids
    Tannic acid
    Maleic acid
    Malonic acid
    Adipic acid
    Succinic acid
    Phthalic acid
  (b) Phenols
    Resorcinol
    Alkylated phenols, e.g., nonyl phenol
  (c) Persulfates
    Ammonium persulfate
    Sodium persulfate
    Potassium persulfate
  (d) Polymeric compounds containing carboxyl or anhydride groups, e.g., copolymers of vinyl methyl ether and maleic anhydride, vinyl ethyl ether and maleic anhydride, styrene and maleic anhydride, and the like.
  (e) Isocyanates, e.g.:
    Tolidine diisocyanate
    2,4-tolylene diisocyanate
    1,5-naphthalene diisocyanate
    4,4'-diphenyl diisocyanate
    1,4-xylylene diisocyanate II. Other means include the use of elevated temperatures to effect the desired insolubilization of the polyvinyl lactam-containing substances on the inorganic stock. While the use of heat to effect the insolubilization of the polyvinyl lactam-containing compounds may be resorted to, as mentioned above, at various stages of the paper-making process it is most expedient to employ this technique during the drying of the paper-like web on the "cans." At 300° F. substantially complete insolubilization of the polymeric substances is obtained in a few minutes. Higher temperatures may be employed to effect a faster insolubilization. Thus at about 500° F. this process takes about 10 seconds. As described above, it is preferred to insolubilize the polyvinyl lactam-containing substances on the inorganic stock since this renders the resultant "paper" product very resistant to moisture (either as vapor or water) and its obvious deleterious effects. It is to be noted, however, that to achieve the benefits of this invention such insolubilization is not absolutely essential because the polymeric compounds employed herein are so highly substantive to the inorganic stock (i.e., glass flakes, fibers, asbestos, mica, etc.) that substantially all of the polymer added as an aqueous solution is exhausted from the water solution onto the fiber in much the same manner one encounters in the dyeing art, so that in the final product, whether insolubilization is resorted to or not, there is present about the same polymer content.

The inorganic materials which are contemplated and operable in the present invention include both natural and synthetic inorganic substances such as glass fibers, silica fibers, ceramic fibers, asbestos fibers, and flake materials such as ceramic flakes, glass flakes, mica and the like and mixtures of these with cellulosic fibers and other synthetics normally employed in paper-making. In addition to mixtures of inorganic fibers and the like with cellulosic fibers, it is possible to employ mixtures containing, in addition to the cellulosic fibers or in lieu thereof, other natural and synthetic fibers and filaments, such as cellulose acetate, poly acrylonitrile fibers, terephthalate polyester fibers, nylon fibers (that is, hexamethylene adipamides) and the like. The amount of polyvinyl lactam-containing polymeric material which may be employed in the process and products of this invention is not critical. As little as 0.1% based on the weight of the inorganic stock gives outstanding results. As much as 10% or more may be used but the preferred range based on the weight of the inorganic stock is from about 0.2% to about 5%. The larger amounts may be used if desired but are not necessary in order to achieve the advantages of this invention. The amount of chemical insolubilizing agent employed where this technique of insolubilization is used may vary in any amounts up to the stoichiometric quantity necessary to effect complete insolubilization of the amount of the polyvinyl lactam-containing polymeric material present. Of the various chemical insolubilizers, those which are preferred are the polymeric compounds containing carboxyl or anhydride groups, and more particularly, copolymers of vinyl alkyl ethers with maleic anhydride. Such copolymers are water-soluble materials and any of these may be used wherein the molecular weights are above about 300. Those which are preferred, however, have molecular weights within the range of about 1000 to 10,000. Such molecular weights are representative of those copolymers which have a specific viscosity of about 0.1 to about 2.0, and these in turn represent K values of about 20 to 75. It is of course understood that copolymers of higher molecular weights may be used provided they satisfy the characteristic of water-solubility. The specific viscosity of these copolymers is determined as described above for the N-vinyl lactams employing a solution of 1 g. of polymer per 100 ml. of 2-butanone at 25° C. The following examples will serve to illustrate this invention without being deemed limitative thereof. In these examples parts are on a weight basis except as otherwise indicated.

*Example 1*

1 g. of blown silica fibers is added to 100 ml. of water. The pH of this fiber-water mixture is made acid to a pH of about 3.5. The silica fibers are characterized as consisting essentially of 100% silica and physically they average from about ½ in. to 1 in. in length and have an average diameter of approximately 0.5 micron. The acidified mixture is then warmed until the temperature thereof is 120° F. To this heated mixture there is then added, based on the weight of the silica fibers present, a quantity of polyvinyl pyrrolidone (K=20) equal to about 1%, that is, about 10 mg. of polyvinyl pyrrolidone are added. The mixture is then subjected to vigorous agitation for about 2 minutes, whereupon the fibers are broken down to a length ranging from about 1/64 in. to about ¼ in. To this mixture there is then added as a 5% aqueous solution sufficient of copolymer of vinyl methyl ether and maleic anhydride (K=20) to chemically insolubilize all of the polyvinyl pyrrolidone present in the mixture. About 5 to 10 drops of the aforementioned aqueous solution is sufficient to accomplish this result. The mixture is then permitted to stand with mild agitation of the solids for several minutes to permit any entrapped air to dissipate from said mixture. The volume of the resultant slurry is then increased about tenfold with water at a temperature of about 100° F. after which the slurry is poured into a standard sheet mold and the wet web couched from a 200 mesh screen. The resultant sheet contains about 0.5% polymer content and has a breaking strength of 10 lbs. per sq. in.

*Example 2*

The procedure of Example 1 is repeated except that the polyvinyl pyrrolidone is added to the fiber-water mixture, the latter at a temperature of 70° F. The sheet resulting from this process has a breaking strength of 1.0 lb. per sq. in.

*Example 3*

The procedure of Example 2 is repeated except that the addition of the polyvinyl pyrrolidone and the copolymer insolubilizer is omitted. The sheet resulting from this process has a breaking strength of 0.1 lb. per sq. in.

Example 4

The procedure of Example 1 is repeated except that a glass fiber is employed in lieu of the silica fibers of that example. The physical and chemical characteristics of the glass fiber are as follows:

Chemical composition:
- $SiO_2$ ---percent-- 54
- CaO ---do---- 16
- $Al_2O_3$ and $Fe_2O_3$ ---do---- 15
- $B_2O_3$ ---do---- 10
- $Na_2O$ and $K_2O$ ---do---- 5

Physical characteristics:
- Fiber length ---inches-- 1/128 to 1/16
- Fiber diameter ---microns-- 0.50
- Fiber appearance—white, soft fibers.

The sheet resulting from this process is similar in its polymer content to that of Example 1. The breaking strength is found to be 25 lbs. per sq. in.

Example 5

The procedure of Example 4 is repeated except that the temperature of the glass fiber-water mixture is 75° F. at the time the polyvinyl pyrrolidone is added. The resultant sheet has a breaking strength of only 2.5 lbs. per sq. in.

Example 6

The procedure of Example 5 is repeated omitting the addition of the polyvinyl pyrrolidone and the copolymer insolubilizer. This sheet has a breaking strength of only 0.04 lb. per sq. in.

Example 7

1 g. of a batch of glass fiber is added to 100 ml. of water adjusted to a pH of 4.5. The glass fibers have the same chemical composition as that of Example 4. The physical characteristics, however, are as follows:

- Fiber length ---inches-- 1/16 to 1/8
- Fiber diameter ---microns-- 1.25
- Fiber appearance—white, coarse fibers.

The procedure of Example 1 is then followed to effect the formation of a finished sheet. The breaking strength of this sheet is 25 lbs. per sq. in.

In the following examples the procedure of Example 1 is followed except that the polymers of vinyl pyrrolidone which are used differ in their K values and also in the chemical substituents present therein. In addition, various chemical insolubilizers are used in lieu of the copolymer of Example 1. These examples are tabulated in Table I below:

TABLE I

| Example | N-Vinyl lactam | Insolubilizer |
|---|---|---|
| 8 | PVP [1] (K=25) | PVM/MA [2] (K=30). |
| 9 | PVP (K=35) | PVM/MA (K=20). |
| 10 | PVP (K=47) | PVM/MA (K=55). |
| 11 | PVP (K=75) | PVM/MA (K=75). |
| 12 | PVP (K=100) | PVE/MA [3] (K=30). |
| 13 | PVP (K=110) | PVE/MA (K=75). |
| 14 | PVP (K=130) | PVE/MA (K=30). |
| 15 | PVMP [4] (K=32) | PVM/MA (K=30). |
| 16 | PVMP (K=50) | PVE/MA (K=75). |
| 17 | PVMP (K=85) | PVPr/MA [5] (K=45). |
| 18 | PVDMP [6] (K=20) | PVM/MA (K=55). |
| 19 | PVDMP (K=50) | PVE/MA (K=75). |
| 20 | PVDMP (K=95) | PVB/MA [7] (K=42). |

[1] Polyvinyl pyrrolidone.
[2] Copolymer of vinyl methyl ether with maleic anhydride.
[3] Copolymer of vinyl ethyl ether with maleic anhydride.
[4] Polyvinyl-3-methyl-2-pyrrolidone.
[5] Copolymer of vinyl-n-propyl ether with maleic anhydride.
[6] Polyvinyl-3,3-dimethyl-2-pyrrolidone.
[7] Copolymer of vinyl isobutyl ether with maleic anhydride.

The breaking strength of the sheets prepared in Examples 8–20 are as follows:

TABLE II

| Example | Breaking Strength (lbs./in.²) |
|---|---|
| 8 | 11 |
| 9 | 11.5 |
| 10 | 12.0 |
| 11 | 13.5 |
| 12 | 11.0 |
| 13 | 13.5 |
| 14 | 12.0 |
| 15 | 10.0 |
| 16 | 11.0 |
| 17 | 11.5 |
| 18 | 10.5 |
| 19 | 11.0 |
| 20 | 12.0 |

Examples 21–33

The procedures of Examples 8 through 20 are repeated except that the pyrrolidone polymer is added to the fiber-water mixture at a temperature of 75° F. In each instance the breaking strength of the resultant sheets is about 1/10 of the corresponding products of Examples 8 through 20; in other words, the strength of the sheets of Examples 21 through 33 range from about 0.8 lb./in.² to 1.3 lb./in.².

Example 34

The procedure of Example 1 is again repeated except that there is used in lieu of polyvinyl pyrrolidone a copolymer of vinyl pyrrolidone (75%) and vinyl acetate (25%) (K=52). The resultant sheet is comparable to that of Example 1.

Examples 35 through 46

In the following examples the procedures of Examples 1 and 4 are repeated, that is, using silica fibers on the one hand and glass fibers on the other hand in the procedures of these examples, employing, however, varying copolymers containing an N-vinyl lactam, and also where indicated, different maleic anhydride copolymers.

TABLE III

| Example | Fiber | N-Vinyl lactam copolymer | K | Insolubilizer |
|---|---|---|---|---|
| 35 | silica | VP/VM (30:70) [1] | 25 | PVM/MA (K=30) [7]. |
| 36 | glass | VP/VM (30:70) [2] | 25 | PVM/MA (K=30). |
| 37 | silica | VP/VE (60:40) [2] | 34 | PVM/MA (K=30). |
| 38 | glass | VP/VE (60:40) | 34 | PVM/MA (K=30). |
| 39 | silica | VP/AA (50:50) [3] | 40 | PVE/MA (K=75) [8]. |
| 40 | glass | VP/AA (50:50) | 40 | PVE/MA (K=75). |
| 41 | silica | VMP/VC (87:13) [4] | 42 | PVE/MA (K=75). |
| 42 | glass | VMP/VC (87:13) | 42 | PVE/MA (K=75). |
| 43 | silica | VP/VS (94:6) [5] | 38 | PVP$_n$/MA (K=45) [9]. |
| 44 | glass | VP/VS (94:6) | 38 | PVP$_n$/MA (K=45). |
| 45 | silica | VP/VA (75:25) [6] | 30 | PVP$_n$/MA (K=45). |
| 46 | glass | VP/VA (75:25) | 30 | PVP$_n$/MA (K=45). |

[1] Copolymer of vinyl pyrrolidone with vinyl methyl ether; monomer content as indicated.
[2] Copolymer of vinyl pyrrolidone and vinyl ethyl ether.
[3] Copolymer of vinyl pyrrolidone and acrylic acid.
[4] Copolymer of vinyl-3-methyl pyrrolidone and vinyl chloride.
[5] Copolymer of vinyl pyrrolidone and vinyl stearate.
[6] Copolymer of vinyl pyrrolidone and vinyl acetate.
[7] Copolymer of vinyl methyl ether and maleic anhydride; K value as indicated.
[8] Copolymer of vinyl ethyl ether and maleic anhydride.
[9] Copolymer of vinyl-n-propyl ether and maleic anhydride.

The results obtained from the above example are comparable insofar as the resultant sheets are concerned to those of Examples 1 and 4.

Examples 47 and 48

The procedures of Examples 1 and 4 are repeated except that the temperature employed is 150° F. instead of 120° F. The final products have breaking strength of 10.2 and 25.3 lbs./sq. in., respectively.

Examples 49 and 50

The procedures of Examples 1 and 4 are again repeated except that the pH is 5.0 instead of 3.5. The sheets produced in accordance with such processes are substantially identical in their characteristics to those obtained in Examples 1 and 4.

Example 51

The procedure of Example 1 is repeated using asbestos fibers in place of the silica fibers of that example. The asbestos fibers are blue, soft fibers characterized by having fiber lengths varying from about ⅛ to ½ in. and fiber diameters averaging about $0.05\mu$. The breaking strength of these sheets is about 60 lbs./sq. in.

Example 52

The procedure of Example 2 is repeated employing the same asbestos fibers as in Example 51. The sheets resulting from this process have a breaking strength of about 1.5 lbs./sq. in.

Examples 53 and 54

Examples 1 and 4 are repeated except that no chemical insolubilizer is used to effect the insolubilization of the lactam polymer. The resultant sheets show a breaking strength of 7.5 lbs./sq. in. and 25 lbs./sq. in., respectively.

Examples 55 and 56

The procedures of Examples 1 and 4 are repeated except that 10 drops of a 10% aqueous solution of maleic acid is used as the chemical insolubilizer. The results are comparable to those of Examples 1 and 4.

Examples 57 and 58

Examples 1 and 4 are again repeated using in lieu of the chemical insolubilizer of those examples in each instance, 20 drops of a 5% aqueous resorcinol solution. Comparable sheets result as in Examples 1 and 4.

Examples 59 and 60

The procedures of Examples 1 and 4 are further repeated using 12 drops of a 10% aqueous ammonium persulfate solution instead of the insolubilizer of those examples. The resultant sheets exhibit similar characteristics as those of Examples 1 and 4.

Examples 61 through 64

The procedures of Examples 1 and 4 are repeated using as the chemical insolubilizer (a) 1 ml. of a 5% aqueous solution of a styrene-maleic anhydride and (b) ½ ml. of a 10% solution of 2,4-tolylene diisocyanate in chlorobenzene. Results similar to those of Examples 1 and 4 are obtained.

Examples 65 and 66

The procedures of Examples 53 and 54 are repeated except that the sheet after removal from the screen and drying is further subjected to a heat treatment at 310° F. for 2 min. The resulting sheets are comparable to those of Examples 1 and 4, respectively.

Examples 67 and 68

Examples 65 and 66 are repeated except that the further heat treatment is conducted at 400° F. for 35 sec. Sheets of similar characteristics result.

Examples 69 and 70

The procedures of 65 and 66 are again repeated except that the heat treatment is conducted at 500° F. for 20 sec. Substantially the same results are obtained as in the previous four examples.

Example 71

1. g. of silica fibers (as described in Example 1) and 0.5 g. of a cellulose pulp are added to 125 ml. of water and the mixture adjusted to a pH of 4.1. This mixture is then stirred vigorously while the temperature is raised to 120° F. Thereupon 1 ml. of a 10% aqueous solution of polyvinyl pyrrolidone (K=20) is added. The mixture is then further agitated for 1 min. after which half of the mixture is used to form a web as described in Example 1. The web so formed and after drying is subjected to a heat treatment of 300° F. for 100 sec. The resultant sheet resembles newsprint in hand, strength and flexibility. To the remaining half of the above described mixture there is added 0.5 ml. of a 5% aqueous solution of a copolymer of vinyl methyl ether with maleic anhydride (K=20). Further processing is carried out as described in Example 1 to form a sheet. This sheet is similar to the one prepared from the other half of the instant mixture.

Example 72

2 g. of mica flakes of miscellaneous dimensional characteristics and averaging about $2\mu$ in thickness and whose chemical composition is

| | Percent |
|---|---|
| $SiO_2$ | 43 |
| $Al_2O_3.Fe_2O_3$ | 40 |
| $Na_2O.R_2O$ | 12 |
| $H_2O$ | 5 | are dispersed with vigorous agitation in 250 mls. of water (pH=4.2). The temperature of the mixture is then raised to 140° F. and there is then slowly added while agitation is continued 1.5 ml. of a 10% aqueous solution of polyvinyl pyrrolidone (K=60). Agitation is continued for several minutes after all of the polyvinyl pyrrolidone has been added, and then there is slowly added 2 ml. of a 10% aqueous solution of a copolymer of vinyl n-butyl ether with maleic anhydride (K=37). A sheet is then formed from this mixture in the manner described in Example 1. The resultant product shows exceptionally and unexpectedly high breaking strength of 12 lbs./sq. in.

Example 73

Repeating the procedures of Example 72 except that the temperatures maintained at all times between 80 and 85° F. result in a sheet which has a breaking strength of only 1.4 lbs./sq. in.

Example 74

The procedure of Example 72 is again repeated using glass flakes in place of the mica flakes of that example. Such flakes have a chemical composition similar to the glass fibers of Example 4. They have an average thickness of $15\mu$ and range in area from ⅛ to ½ in.² The resultant sheet has a breaking strength of 3.5 lb./sq. in. A similar sheet prepared at a temperature of 75° F. has a breaking strength of less than ½ lb./sq. in.

In addition to the materials, compounds and compositions which have been specifically exemplified above and further, in addition to those processing conditions which have been specifically shown in these examples, it is clear and within the purview of this invention to employ all of the other materials, compounds and compositions here disclosed and their equivalences, and it is also possible to employ other conditions than those specifically shown but which come within the scope of the conditions taught herein. Further, while the lower limit of temperature for carrying out the instant process is described herein as being about 120° F. and the upper limit about 150° F., it is possible to employ temperatures above this upper limit except that no selected upper temperature should be used which has a detrimental or deleterious action on the components employed in the processes of this invention. Further, it is not deemed advantageous to employ temperatures above about 150° F. since no advantages accrue from such additional elevation of the temperature range and obviously, because of the poor economics, it would not be desirable to go above this upper limit. Further, while this invention has been disclosed and exemplified with respect to siliceous fibers and flakes, other inorganic fibers of natural or synthetic origin and other flake materials will be equally operable.

Variations and modifications which will be obvious and apparent to those skilled in the art may be made in the procedure above described without departing from the scope and spirit of my invention.

I claim:

1. In a process for preparing a sheet-like product from siliceous stock material comprising incorporating into said stock from about 0.1 to about 10% of a water-soluble N-vinyl lactam containing polymeric substance, and then forming a sheet from said stock, the improvement which comprises maintaining the temperature of the said stock material above about 120° F. during the incorporation of the polymeric substance.

2. In a process for preparing a sheet-like product from siliceous stock material comprising incorporating into said stock from about 0.2 to about 5% of a water-soluble N-vinyl lactam containing polymeric substance, and then forming a sheet from said stock, the improvement which comprises maintaining the temperature of the said stock material above about 120° F. during the incorporation of the polymeric substance.

3. In a process for preparing a sheet-like product from siliceous stock material comprising incorporating into said stock from about 0.2 to about 5% based on the weight of said stock of a water-soluble polymeric substance containing at least 20% of an N-vinyl lactam, and then forming a sheet from said stock, the improvement which comprises maintaining the temperature of the said stock material above about 120° F. during the incorporation of the polymeric substance.

4. A process as defined in claim 3 wherein the stock comprises silica fibers.

5. A process as defined in claim 3 wherein the stock comprises glass fibers.

6. A process as defined in claim 3 wherein the stock comprises asbestos fibers.

7. A process as defined in claim 3 wherein the stock comprises mica.

8. In a process for preparing a sheet-like product from siliceous stock material comprising incorporating into said stock from about 0.1 to about 10% based on the weight of the said stock of a water-soluble homopolymeric N-vinyl lactam and then forming a sheet therefrom, the improvement which comprises maintaining the temperature of the said stock from about 120° F. to about 150° F. during the incorporation of the polymeric substance.

9. In a process for preparing a sheet-like product from siliceous stock material comprising incorporating into said stock from about 0.1 to about 10% based on the weight of the said stock of a water-soluble copolymer containing at least 20% of an N-vinyl lactam, and then forming a sheet therefrom, the improvement which comprises maintaining the temperature of the said stock from about 120° F. to about 150° F. during the incorporation of the polymeric substance.

10. In a process for preparing a sheet-like product from siliceous stock material comprising incorporating into said stock from about 0.1 to about 10% based on the weight of the said stock of a water-soluble N-vinyl lactam containing polymeric substance, insolubilizing said polymeric substance, and then forming a sheet therefrom, the improvement which comprises maintaining the temperature of the said stock from about 120° F. to about 150° F. during the incorporation of the polymeric substance.

11. A process as defined in claim 10 wherein the insolubilization is effected by means of a chemical insolubilizer.

12. A process as defined in claim 11 wherein the insolubilizer is a maleic anhydride containing copolymer.

13. A process as defined in claim 10 wherein the insolubilization is effected by means of an elevated temperature.

14. In a process for preparing a sheet-like product from siliceous stock material comprising incorporating into said stock from about 0.1 to about 10% by weight based on the weight of said stock of a water-soluble polyvinyl pyrrolidone, insolubilizing said polyvinyl pyrrolidone by the subsequent addition of a copolymer of a vinyl alkyl ether with maleic anhydride and then forming a sheet from said stock mixture, the improvement which comprises maintaining the temperature of the said stock material at a temperature from about 120° F. to about 150° F.

15. In a process for preparing a sheet-like product from glass fibers comprising the steps of suspending said fibers in an aqueous medium, adding to said suspension 0.6% by weight based on the weight of the glass fibers of a water-soluble polyvinyl pyrrolidone, then adding to said suspension sufficient amount of a water-soluble copolymer of vinyl methyl ether and maleic anhydride to insolubilize the polyvinyl pyrrolidone, and finally forming a sheet from said suspension mixture, the improvement which comprises maintaining the temperature of said suspension at about 120° F. during the addition of the polyvinyl pyrrolidone.

References Cited in the file of this patent

UNITED STATES PATENTS

| | | |
|---|---|---|
| 2,265,450 | Reppe et al. | Dec. 9, 1941 |
| 2,335,454 | Schuster et al. | Nov. 30, 1943 |
| 2,694,630 | Landes et al. | Nov. 16, 1954 |
| 2,698,558 | Hawley et al. | Jan. 4, 1955 |
| 2,758,026 | Landes et al. | Aug. 7, 1956 |
| 2,859,109 | Hawley et al. | Nov. 4, 1958 |
| 2,901,390 | Conklin et al. | Aug. 25, 1959 |

OTHER REFERENCES

O'Leary et al.: TAPPI, vol. 37, No. 10, October 1954, pp. 446–450.